Sept. 20, 1966    R. L. WELLS    3,273,855
VALVE SEAT FOR GATE VALVES

Filed July 11, 1963    2 Sheets-Sheet 1

INVENTOR.
RUSSEL L. WELLS
BY
Head & Johnson
ATTORNEYS

Sept. 20, 1966 R. L. WELLS 3,273,855
VALVE SEAT FOR GATE VALVES
Filed July 11, 1963 2 Sheets-Sheet 2

INVENTOR.
RUSSEL L. WELLS
BY
*Head & Johnson*
ATTORNEYS

United States Patent Office 3,273,855
Patented Sept. 20, 1966

3,273,855
VALVE SEAT FOR GATE VALVES
Russel L. Wells, 7322 E. 22nd Place, Tulsa, Okla.
Filed July 11, 1963, Ser. No. 294,414
4 Claims. (Cl. 251—328)

This invention relates to valves, more particularly to a gate valve having improved sealing means.

It is a primary object of this invention to provide a sealing member for a valve member of the reciprocable slab gate type valve member.

Another object of this invention is to provide a relatively resilient seal adaptable to have primary and secondary sealing quality with respect to a valve body and reciprocable slab gate type member. More particularly, it is an object to provide a sealing member which is adaptable to provide even greater sealing upon application of fluid pressure thereto.

Another object of this invention is to provide sealing member for a reciprocable slab gate type valve which is easy to assemble and replace.

These and other objects of this invention will become more apparent upon further reading of the specification and claims when taken in conjunction with the following illustration of which:

Description

Figure 1:
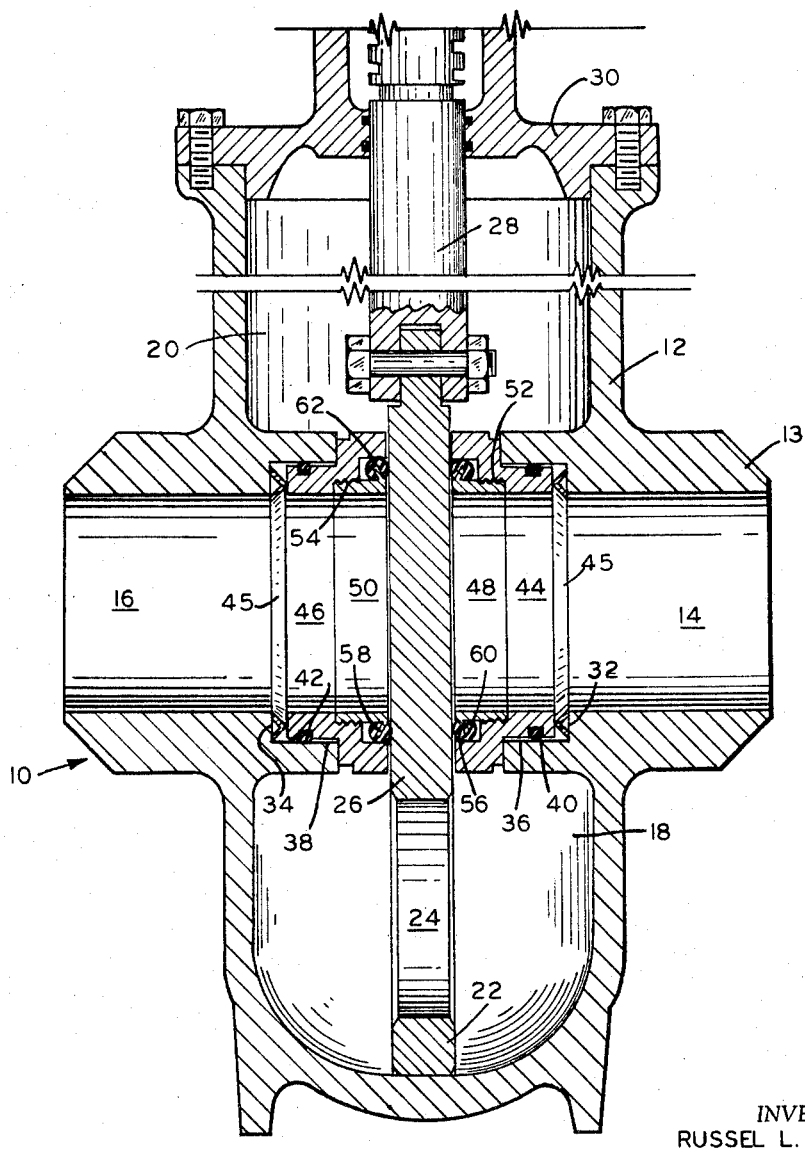
FIGURE 1 is a fragmentary vertical cross-section of a gate valve constructed according to this invention.

Referring now to the drawings, FIGURE 1 shows a through conduit gate valve 10 which includes a body portion 12 and line connection means 13. In this instance a welded connection is shown, however it is understood that flanged or threaded connection are also adaptable for use with this invention. The body 12 includes aligned flow passages 14 and 16 which terminate with respect to connected lower and upper valve chambers 18 and 20. A gate member 22 is reciprocable with the valve chamber and includes opening 24 which is alignable within the passage ways 14 and 16 in the open position. The gate member also includes a solid portion 26 adaptable to shut off the flow through passage ways 14 and 16, as shown. A stem 28 attached to the gate member is reciprocably and sealably mounted within bonnet 30. Naturally, any well known means to cause reciprocation of said stem and gate member is well within the purview of this invention. At the ends of passage ways 14 and 16 facing the valve chamber are machined recess walls 32 and 34 which intersect the passage ways and annular walls 36 and 38 which are coaxial with the passage way. Within these recesses are the assembled sealing ring members comprising retainers 44 and 46 and sealing rings 48 and 50. The retainer rings 44 and 46 are sealed with respect to the recess annual walls by O-rings 40 and 42. A spring ring 45 is positioned adjacent the end walls 32 and 34 to normally bias the assembled sealing range toward each other and more specifically toward the gate member 22, and hence assist in effecting a static seal. The sealing ring members 48 and 50 are typically threadably attached to the retainer rings 44 and 46 by threads 52 and 54. Extending outwardly and rearwardly from the rings 48 and 50 are relatively resilient lip member 56 and 58 about which are molded resilient seal members 60 and 62. (See FIGURE 2).

Figure 3:
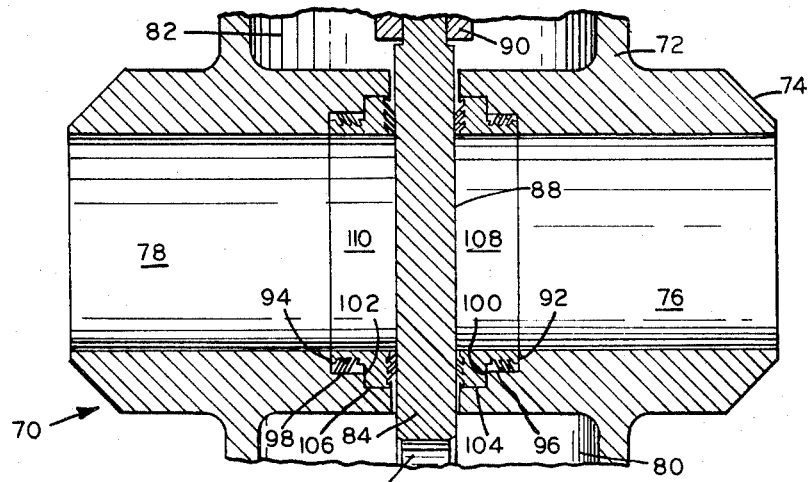
FIGURE 3 is a fragmentary vertical cross-section of a gate valve incorporating another embodiment of this invention.

Referring now to FIGURE 3 another embodiment of this invention is described. A typical gate valve 70 includes a body portion 72 and line connection means 74. Aligned passage ways 76 and 78 terminate adjacent lower and upper connected valve chambers 80 and 82 within which a gate member 84 having opening 86 and solid portion 88 is reciprocably positioned. A stem portion 90 is attached to the gate member 84 and to any well known means for causing reciprocation thereof. Each of the passage ways 76 and 78 terminate with facing annular recesses surrounding each passage way. Each recess having first end wall portions 92 and 94, first annular wall portions 96 and 98, second end wall portions 100 and 102 and second annular wall portions 104 and 106. For the most part, the end wall portions intersect the passage ways while the annular wall portions are coaxial thereto, with the exception of annular wall portions 96 and 98 which can be more amply described by reference to FIGURE 5, wherein a slight beveled portion 99 assists in removing and replacing the sealing rings 108 and 110.

Figure 4:
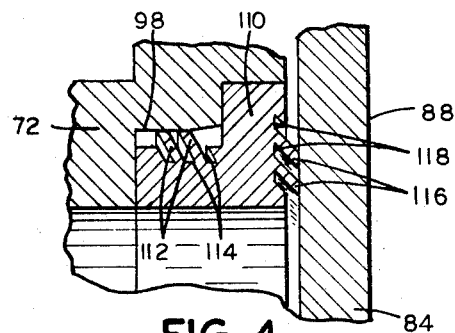
FIGURE 4 is an enlarged partial sectional view of the sealing ring of the embodiment of FIGURE 3.

Referring now to FIGURE 4 an enlarged portion of the sealing ring 110 shown in its assembled position and which includes first peripheral lip rings 112 having adjacent grooves 114 and second coaxial lip rings 116 having adjacent grooves 118. With regard to the embodiment of FIGURES 1 and 2 it can be readily seen that the sealing rings provide a primary seal because of the sliding fit of gate member 22 with respect to the face surface 51 of retainer 46, and surface 53 of seal ring 50. In addition thereto a secondary seal is achieved by the elasticity of bonded resilient member 60 or 62 about the resilient lip ring portions 56 or 58 respectively. In the design of the threaded portion 54 there is provided sufficient loose fit that any line pressure in passage way 16 tends to cause further deformity of the resilient bonded portion 60 and or movement of lip ring 58 to further cause effective sealing of the valve body with respect to the gate member.

Figure 5:
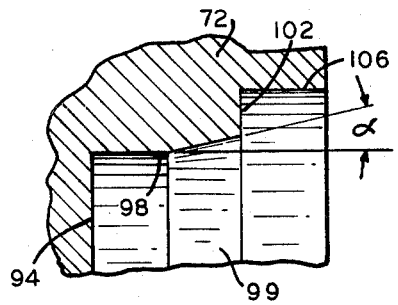
FIGURE 5 is a partial sectional view of the valve body adaptable to receive the sealing ring of the embodiment shown in FIGURES 3 and 4.

In the embodiment of FIGURES 3, 4, and 5 are ring members 108 and 110 are adapated to be removed and replaced within their respective recesses by well known types of hydraulic or mechanical loading tools. To assist with their placement within the valve body portion 72 a tapered portion 99 at an angle alpha of 3° is formed in annular wall 98 which causes a downward movement of first lip ring members 112 as they flex with respect to grooves 114. Second lip ring members 116 provide an effective seal with respect to the in-line passageways and gate member 88.

It has been found in use of the embodiment of FIGURES 3, 4, and 5 that the first and second lip ring members provide an effective static and pressure seal with respect to the valve body and the gate member. That is, any pressure built up or temperature increase against first lip rings 112 will normally cause them to expand outward into tighter engagement with annular wall 98 and likewise to cause second lip ring members 116 to expand outward into tighter engagement with gate member 88. Groove portions 114 and 118 form an important part of this embodiment in that they provide the space for flexing of first and second lip ring members respectively.

Figure 2:
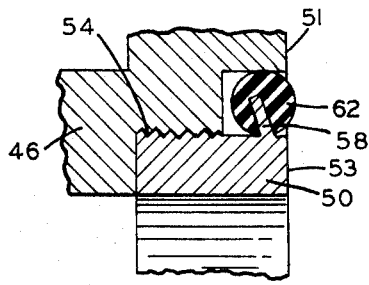
FIGURE 2 is a partial sectional view of the sealing elements described in FIGURE 1.
Figure 6:
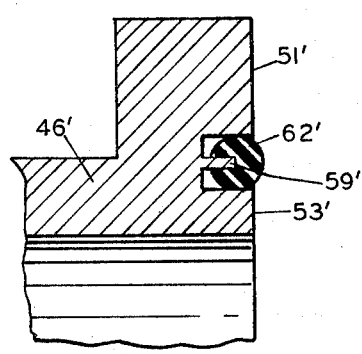
FIGURE 6 is a partial sectional view of a valve seal element substantially similar to the seal ring of FIGURES 1 and 2 except of unitized construction, wherein like parts are used.

The embodiment of FIGURE 6 includes all of the elements of the seal ring described in FIGURES 1 and 2, eliminating the two-part ring elements and using a one piece ring 46' complete with machined surfaces 51' and 53' and a groove wherein resilient lip member 59' extends outwardly parallel to the axis of the passageway through the ring 46'. Resilient element 62' is molded thereabout in such manner to effect a seal with the gate member.

This invention has been described by reference to specific and preferred embodiments. It will be apparent however that many modifications can be made without departing from the spirit of the invention. For example, in the embodiment of FIGURES 1 and 2, the resilient or deformable material 60 and 62 can be composed of rubber or plastics such as semielastomeric materials such as Teflon or nylon, or polyolefins such as polyethylene or polypropylene. Accordingly, this invention should be construed not to be limited to the embodiment as herein described but should be limited only by the scope of the appended claims.

What is claimed:
1. A gate valve, the combination comprising:
    a body having a substantially circular passageway therethrough;
    a valve chamber intersecting said passageway;
    a reciprocable slab gate member located in said valve chamber, said gate member provided with a passage alignable with the said circular passageway in the open position and a solid portion to cover said passageway in the closed position;
    facing annular recesses surrounding said passageway;
    a seat member in each of said recesses, each of said seat members formed of an annular ring having a primary seating face for sealed contact with said gate member and an annular groove in said ring opening at said primary seating face and toward said gate member, said seat member including an integral lip member ring therein which extends partially into said groove; and
    a deformable sealing member bonded to and covering said lip ring and a dimension whereby said sealing member is contactable against said gate member to form a secondary seating face against said gate member.

2. A gate valve as described in claim 1 wherein said lip member ring is inclined in said groove away from said gate member.

3. A gate valve according to claim 1 wherein said lip member ring is substantially parallel and coaxial to the axis of said groove.

4. A gate valve according to claim 1 wherein said deformable member substantially fills said groove and extends slightly beyond said primary seating face.

References Cited by the Examiner

UNITED STATES PATENTS

| | | | |
|---|---|---|---|
| 1,679,779 | 8/1928 | Oberhuber | 277—207 X |
| 1,874,405 | 8/1932 | Wood | 251—328 |
| 2,882,073 | 4/1959 | James | 277—208 X |
| 2,984,449 | 5/1961 | Le Clair | 251—334 X |
| 2,985,422 | 5/1961 | Anderson | 251—328 X |
| 3,002,525 | 10/1961 | Grove | 251—327 X |
| 3,065,951 | 11/1962 | Fennema | 251—174 X |

WILLIAM F. O'DEA, *Primary Examiner.*

CLARENCE R. GORDON, *Examiner.*